(12) United States Patent
Garg et al.

(10) Patent No.: US 9,047,173 B2
(45) Date of Patent: Jun. 2, 2015

(54) TRACKING AND ELIMINATING BAD PREFETCHES GENERATED BY A STRIDE PREFETCHER

(71) Applicant: Advanced Micro Devices, Inc., Sunnyvale, CA (US)

(72) Inventors: Alok Garg, Whitefield (IN); Sharad Bade, Acton, MA (US); John Kalamatianos, Arlington, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 186 days.

(21) Appl. No.: 13/773,166

(22) Filed: Feb. 21, 2013

(65) Prior Publication Data

US 2014/0237212 A1   Aug. 21, 2014

(51) Int. Cl.
*G06F 9/26* (2006.01)
*G06F 12/02* (2006.01)
*G06F 12/08* (2006.01)

(52) U.S. Cl.
CPC ........ *G06F 12/0215* (2013.01); *G06F 12/0862* (2013.01)

(58) Field of Classification Search
None
See application file for complete search history.

(56) References Cited

U.S. PATENT DOCUMENTS

| 5,953,512 | A | * | 9/1999 | Cai et al. ................. 712/205 |
|---|---|---|---|---|
| 6,571,318 | B1 | * | 5/2003 | Sander et al. ............. 711/137 |
| 6,915,404 | B1 | * | 7/2005 | Desai et al. ............... 711/204 |
| 7,603,526 | B2 | * | 10/2009 | VanStee et al. ........... 711/154 |
| 8,352,686 | B2 | * | 1/2013 | Ju ............................ 711/137 |
| 2007/0055824 | A1 | * | 3/2007 | Diefendorff et al. ..... 711/137 |
| 2007/0088915 | A1 | * | 4/2007 | Archambault et al. .... 711/137 |
| 2007/0106849 | A1 | * | 5/2007 | Moore et al. ............. 711/137 |
| 2007/0288697 | A1 | * | 12/2007 | Keltcher .................. 711/137 |
| 2008/0301375 | A1 | * | 12/2008 | Donawa et al. ........... 711/137 |
| 2009/0006762 | A1 | * | 1/2009 | Gara et al. ............... 711/137 |
| 2009/0119471 | A1 | * | 5/2009 | Hur et al. ................. 711/167 |
| 2010/0169606 | A1 | * | 7/2010 | Deneau .................... 711/204 |
| 2010/0250854 | A1 | * | 9/2010 | Ju ............................ 711/125 |
| 2010/0268893 | A1 | * | 10/2010 | Luttrell .................... 711/137 |
| 2013/0024626 | A1 | * | 1/2013 | Benhase et al. .......... 711/137 |
| 2013/0132680 | A1 | * | 5/2013 | Peleg ....................... 711/137 |
| 2013/0232320 | A1 | * | 9/2013 | Dale et al. ................. 712/27 |
| 2013/0238861 | A1 | * | 9/2013 | Manne et al. ............. 711/137 |
| 2013/0318306 | A1 | * | 11/2013 | Gonion .................... 711/137 |

* cited by examiner

*Primary Examiner* — Aimee Li
*Assistant Examiner* — Dustin Bone
(74) *Attorney, Agent, or Firm* — Volpe and Koenig, P.C.

(57) ABSTRACT

A method, an apparatus, and a non-transitory computer readable medium for tracking prefetches generated by a stride prefetcher are presented. Responsive to a prefetcher table entry for an address stream locking on a stride, prefetch suppression logic is updated and prefetches from the prefetcher table entry are suppressed when suppression is enabled for that prefetcher table entry. A stride is a difference between consecutive addresses in the address stream. A prefetch request is issued from the prefetcher table entry when suppression is not enabled for that prefetcher table entry.

16 Claims, 7 Drawing Sheets

TRACKING AND ELIMINATING BAD PREFETCHES GENERATED BY A STRIDE PREFETCHER

TECHNICAL FIELD

The disclosed embodiments are generally directed to a prefetcher in a processor, and in particular, to a mechanism for tracking and eliminating bad prefetches generated by a stride prefetcher.

BACKGROUND

A prefetcher is used in a processor to improve overall processor performance by speculatively fetching data or instructions before the processor requests the data or instructions. The prefetched data or instructions may be stored in a cache memory or in a buffer.

To hide long memory access latencies, a data prefetcher is commonly used by a processor to anticipate future data references and prefetch those data references to associated caches. The performance improvement achieved by a prefetcher depends on how accurately and timely it prefetches data. Prefetched data that remains unused wastes memory bandwidth, and may also pollute the cache by replacing other data that may be referenced in the near future. The proportion of useless prefetches depends on the prefetching algorithm used. A popular prefetching algorithm is stride prefetching. A stride prefetcher recognizes linear strides among consecutive addresses and uses the recorded stride to prefetch ahead of the currently accessed address stream.

Suppressing potentially useless stride prefetches efficiently and accurately is difficult, because it is not only difficult to detect and predict useless prefetches, but the performance penalty of erroneously suppressing a useful prefetch is also significant.

SUMMARY OF EMBODIMENTS

Some embodiments provide a method for tracking prefetches generated by a stride prefetcher. Responsive to a prefetcher table entry for an address stream locking on a stride, prefetch suppression logic is updated and prefetches from the prefetcher table entry are suppressed when suppression is enabled for that prefetcher table entry. A stride is a difference between consecutive addresses in the address stream. A prefetch request is issued from the prefetcher table entry when suppression is not enabled for that prefetcher table entry.

Some embodiments provide an apparatus for tracking prefetches generated by a stride prefetcher. A monitor unit is configured to monitor an address stream to determine that a new address from an address stream is directed to a prefetcher table. A prefetcher is in communication with the monitor unit, and is configured to prefetch addresses for the address stream and determine whether the prefetcher table entry has locked on a stride. A suppression unit is in communication with the monitor unit and the prefetcher, and is configured to suppress prefetches from the prefetcher table entry when suppression is enabled for that prefetcher table entry. The suppression is further configured to issue a prefetch request from the prefetcher table entry when suppression is not enabled for that prefetcher table entry.

Some embodiments provide a non-transitory computer-readable storage medium storing a set of instructions for execution by a general purpose computer to track prefetches generated by a stride prefetcher. An updating code segment updates prefetch suppression logic responsive to a prefetcher table entry for an address stream locking on a stride. A suppressing code segment suppresses prefetches from the prefetcher table entry when suppression is enabled for that prefetcher table entry. An issuing code segment issues a prefetch request from the prefetcher table entry when suppression is not enabled for that prefetcher table entry.

BRIEF DESCRIPTION OF THE DRAWINGS

A more detailed understanding may be had from the following description, given by way of example in conjunction with the accompanying drawings, wherein.

DETAILED DESCRIPTION

A method, an apparatus, and a non-transitory computer readable medium for tracking prefetches generated by a stride prefetcher are presented. Prefetch suppression logic is updated if a prefetcher table entry for an address stream has locked on a stride, wherein a stride is a difference between two consecutive addresses in the address stream. A prefetch request is issued from the prefetcher table entry if suppression is not enabled for that prefetcher table entry. Prefetches from the prefetcher table entry are suppressed if suppression is enabled for that prefetcher table entry.

Figure 1:
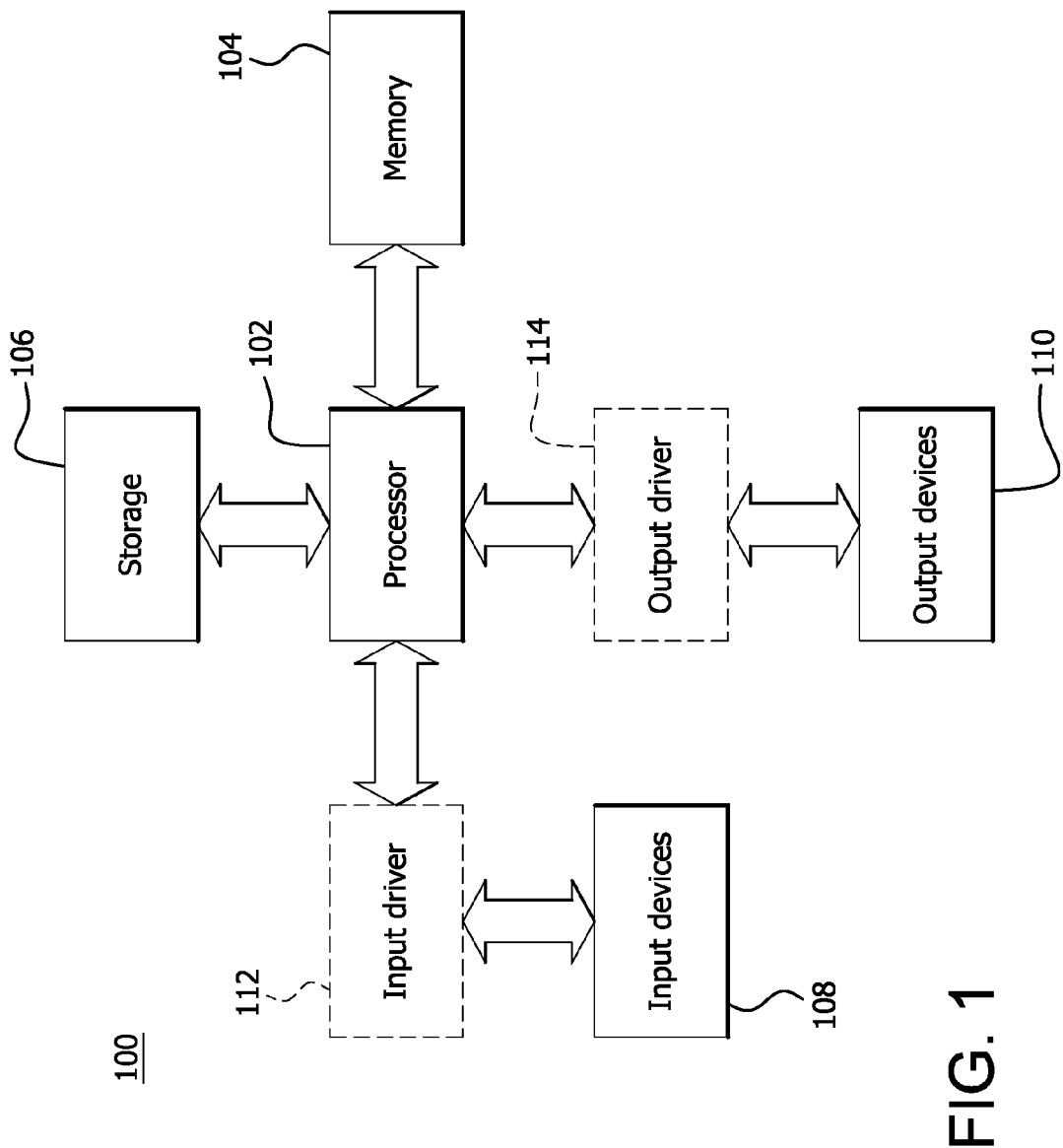
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

To be able to prefetch data ahead of its actual use, a stride prefetcher often prefetches a few offsets (strides) ahead of the currently accessed address stream, commonly referred to as a "stride distance" (D). Strided accesses are usually generated by loops in the program code. The first time that a stream with a constant stride is detected, it will likely remain stable for several iterations of the loop (assuming that the loop exhibits typical loop characteristics).

It has been observed that a stream of data accesses with consecutive addresses at a constant offset (stride) often transitions to an address space with either a different stride or a non-constant stride before reverting back to the original stride pattern. Stride prefetchers have hardware that allows them to lock onto these access patterns and start prefetching ahead of time on the address to be accessed next (to hide the latency for fetching those addresses into the cache). The stride prefetcher usually has a confidence mechanism that tracks the address stream and allows it to unlock away from the stored stride when the confidence on the stored stride decreases. The confidence can decrease when the address stream stays outside of the pattern (e.g., not having the constant stride between two consecutive addresses) for a sustained period of time. The stride prefetcher can then be retrained to a new stride.

The last few prefetches generated before transitioning to a new address space usually remain unused, and hence lead to useless prefetches. The stride prefetcher is already trained to fetch ahead. When it sees this temporary interruption in the stride, it has already prefetched ahead, so some of the prefetches will be inaccurate because the stride stream has been interrupted. This wastes power and pollutes the cache with entries that will not be used and forces out entries that may be used or reused.

It has also been observed that these address space transitions are often periodic and the length of the address stream between transitions may be predicted. Useless prefetches may be eliminated by predicting these address space transitions and suppressing prefetch generation that targets addresses outside the predicted length, thus improving the accuracy of the stride prefetcher. The following example illustrates this behavior.

Snapshot of a striding data address stream (AS1) in address space A with an offset=1:

AS1: A, A+1, A+2, A+3, A+4, A+5, A+6 . . . .

A typical prefetch stream targeting AS1 would be (where D is the stride distance):

PS1: A+1 . . . D, A+D+1, A+D+2, A+D+3, A+D+4, A+D+5, A+D+6 . . . .

This prefetch stream (PS1) accurately prefetches the data address stream AS1 from address A+1 to the stride distance D and then incrementally beyond the stride distance D if the address stream AS1 continues without any or with few address space transitions. But accuracy is reduced significantly if the number of address space transitions rises. For example, for the following data address stream snapshot (AS2), AS2: A+1, A+2, A+3, A+4, A+5, B, B+1, B+2, B+3, B+4, B+5, C, C+1, C+2, C+3, C+4, C+5 . . . .

address space transitions from A to B to C may be observed. A typical prefetch stream with a stride distance D=4 targeting AS2 would be:

PS2: A+1 . . . 4, A+5, A+6, A+7, A+8, A+9, B+1 . . . 4, B+5, B+6, B+7, B+8, B+9, C+1 . . . 4, C+5, C+6, C+7, C+8, C+9 . . . .

In PS2, the stride prefetcher remains four offsets ahead of AS2. During address space transitions, the stride prefetcher tries to catch up with the data address stream by generating a burst of four prefetches. From PS2, it may be observed that the last four prefetches generated before each address space transition do not predict AS2 accesses correctly, and may prefetch unused data.

In the above example, for a transition periodicity (the length of the address stream between address space transitions) of 6 and a stride distance of 4, only 56% of all prefetches generated are useful.

For a transition periodicity of length P and stride distance D, the accuracy of a typical stride prefetcher is:

$$\text{Accuracy} = \frac{P-1}{P+D-1} \times 100$$

If P is much larger than D (i.e., P>>D), the accuracy approaches 100%.

It has been observed that a significant number of data address streams exist with periodic address space transitions and P≈D or P is not much greater than D. These observations may be used to predict P and suppress useless prefetches.

The embodiments described herein can detect a pattern of interruptions, and the pattern is tracked in a hardware table. If it can be predicted when an address sequence will be interrupted, prefetching beyond that point on the current address stream will be suspended, to suppress any unnecessary prefetches on the current address stream. It is noted that prefetching for other address streams will not be affected.

Strides are tracked as in existing stride prefetchers, and additional fields are added to the existing stride prefetcher table entry along with some additional suppression logic. The prefetcher table is often located close to the cache where the prefetches are being stored. For example, for a level 2 (L2) prefetcher, the table will be located close to the L2 cache.

The stride prefetcher is trained to recognize that an address stream will transition at a certain point by tracking the length of a stream with a same stride. The first time that the prefetcher sees an address that does not observe the stride for the address stream, it stores the stream length (the number of addresses seen so far from the address stream after the last transition). The stored stream length is used when the prefetcher returns to the address stream following the stored stride. The prefetcher assumes that the length of the next portion of the address stream will be the same as the stored stream length. The stored stream length is also used to suppress prefetches beyond the end of the stream length.

One prediction mechanism waits for a particular value of P to be seen twice in consecutive address space transitions before using the last observed value to predict the next transition. Any diversion from the last predicted value halts the prediction (by disabling prefetch suppression) until a new value of P is observed twice.

An additional optimization to this mechanism is to allow two diversions from the last predicted value of P to be monitored before discarding the current value of P and recording it again. This may be helpful in the case where the address space AS3 is:

AS3: A, A+1, A+2, A+3, A+4, B, A+5, A+6 . . . .

Where an occasional access to a different address space is interjected within AS3 (one reference to B). This can happen in a processor that employs out of order load/store scheduling or because of issuing wrong path loads and stores that may not fall in the current address space.

To avoid this scenario, the length predictor logic can be trained with load/store addresses that are generated at retire time. Due to absence of bad path or out of order addresses, the length predictor may be trained more accurately. A similar effect can be achieved by creating a shadow model of the load/store queues in the processor, which tracks loads and stores in program order. These shadow queues can be updated with load/store addresses in an out-of-order fashion (as they are picked by the scheduler) but they pass the address stream to the data prefetcher in a program order fashion by tracking the oldest load/store that has not generated an address yet.

Once P is predicted, an additional countdown counter (CD) is used to suppress useless prefetches. Because the prefetcher looks ahead from the current address in the address stream, it is necessary to suppress prefetching before the next transition is reached; otherwise, the prefetcher would access addresses beyond the stream length. In one implementation, the prefetching is stopped at the stride distance from the end of the stream length.

CD starts with the value of P on detection of an address space transition and counts down every time an access from the data stream is observed. Prefetches are allowed to be issued only when the value of CD is greater than or equal to D. The remaining requests generated by the stride prefetcher are ignored.

Another mechanism to predict the value of P is to enhance the logic that tracks randomness in the address space and builds confidence when deciding to enable or disable prefetch suppression. In another embodiment, a confidence indicator may be implemented. The confidence indicator looks at two consecutive interruptions in the address stream. The value of P is changed once there are two diversions from the pattern.

Figure 2:
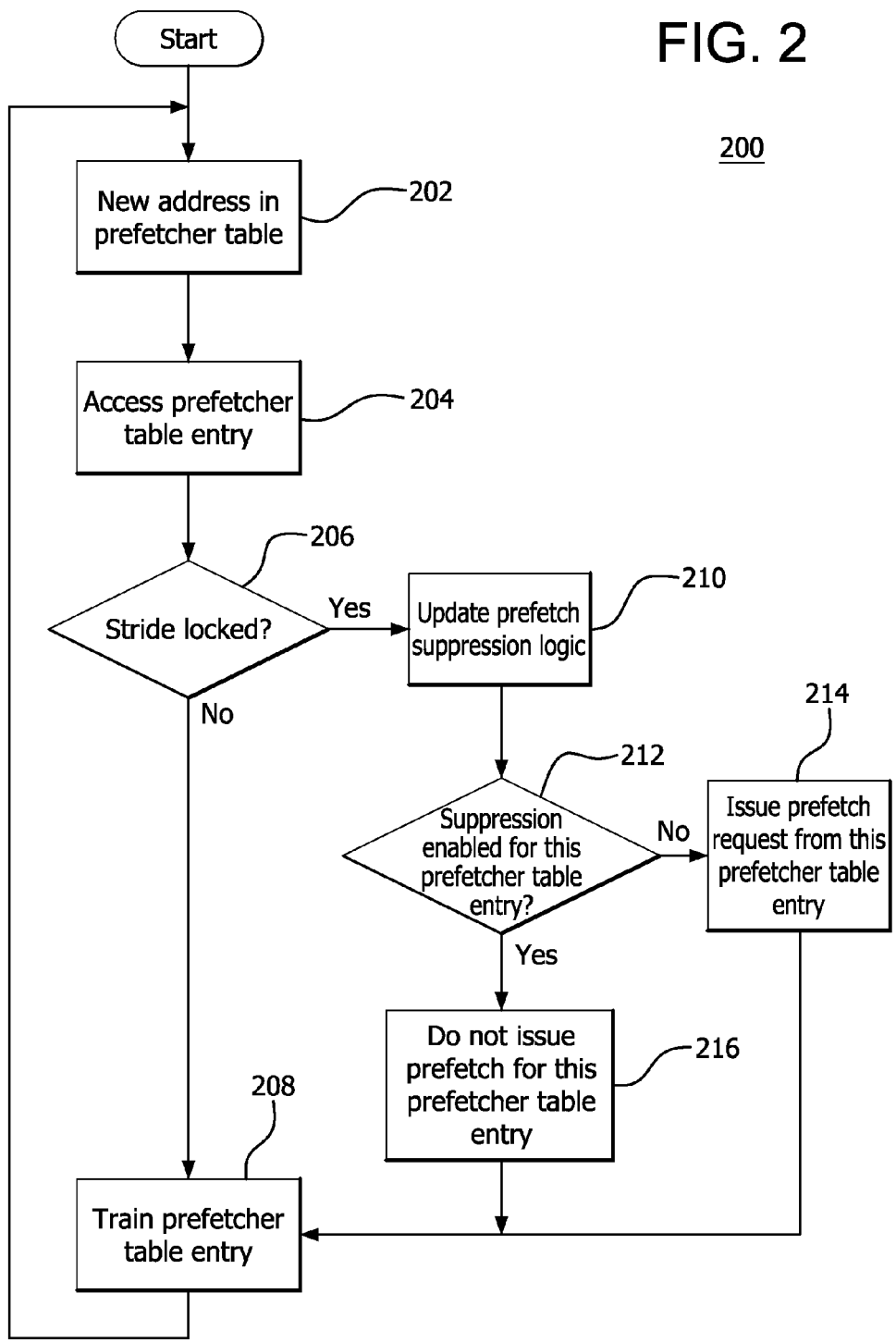
FIG. 2 is a flowchart of a method for tracking prefetches in a stride prefetcher, according to some embodiments.

FIG. 2 is a flowchart of a method 200 for tracking prefetches generated by a stride prefetcher, according to some embodiments. A new address from an address stream is directed to the prefetcher table (step 202) and the prefetcher table entry for that address is accessed (step 204). A determination is made whether the prefetcher table entry has locked on a stride (step 206). If the prefetcher table entry has not locked on a stride, then the prefetcher table entry is trained using the new address (step 208), and the method 200 waits for the next new address from the address stream as described above (step 202).

Each prefetcher table entry locks onto a stride, independent of the other table entries. The prefetcher uses a table comprising of a number of entries. The table may be indexed, for example, by the program counter of a load or a store that is sent to the prefetcher. The indexing of the table allows each prefetcher table entry to be trained separately. For example, if the program counter is used, each prefetcher table entry is trained with the addresses of a single load or store instruction. At any point in time, the number of prefetcher table entries that locked onto a stride depend on the load/store addresses that are sent to train the prefetcher, the order by which they accessed the table, and the indexing function (which dictates which addresses will train which table entries). Once a table entry has locked onto a stride, it can be unlocked as well, if the stream of addresses accessing that entry changes behavior.

Training refers to the action of accessing any prefetcher table entry with the address of a load/store instruction and updating the prefetcher table entry based on some algorithm. The training is independent of whether an entry has locked onto a stride or not. Training happens all the time, as long as the prefetcher is enabled. Locking onto a stride implies that a prefetcher table entry has been trained by several addresses of a load or store instruction (if the prefetcher is indexed by the program counter, for example) and that the addresses exhibit a certain strided behavior (for example, A, A+X, A+2x, A+3x, etc.).

If the prefetcher table entry has locked on a stride (step 206), then the prefetch suppression logic is updated (step 210). One example of implementing the prefetch suppression logic is shown in FIG. 4, and is described in detail below. Next, a determination is made whether suppression has been enabled for the current prefetcher table entry (step 212). If suppression has not been enabled, then a prefetch request is issued from the current prefetcher table entry (step 214). The prefetcher table entry is trained using the new address (step 208), and the method 200 waits for the next new address from the address stream as described above (step 202).

If suppression has been enabled for the current prefetcher table entry (step 212), then a prefetch for the current prefetcher table entry is not issued (step 216). The prefetcher table entry is trained using the new address (step 208), and the method 200 waits for the next new address from the address stream as described above (step 202).

It is noted that the prefetcher keeps generating prefetches, independent of the prefetch suppression logic. The prefetch suppression logic makes a decision if the generated prefetch can be issued to the execution unit or not. The method 200 suppresses prefetches only for the prefetcher table entry that has locked on a stride. Locking on a stride is equivalent to detecting the stride and raising the confidence high enough to start issuing prefetch requests. Most stride prefetchers use some sort of confidence mechanism before issuing prefetches based on a given stride. For example, if the address stream exhibits a stride but not consistently enough for the prefetcher table to lock on it, prefetches will not be suppressed because no prefetches will be issued by the prefetcher for that stride. Even if the prefetcher table locks on a stride, prefetches may not be suppressed if, for example, the stride does not change or the end of the stream is not detected at consistent intervals.

Figure 3:
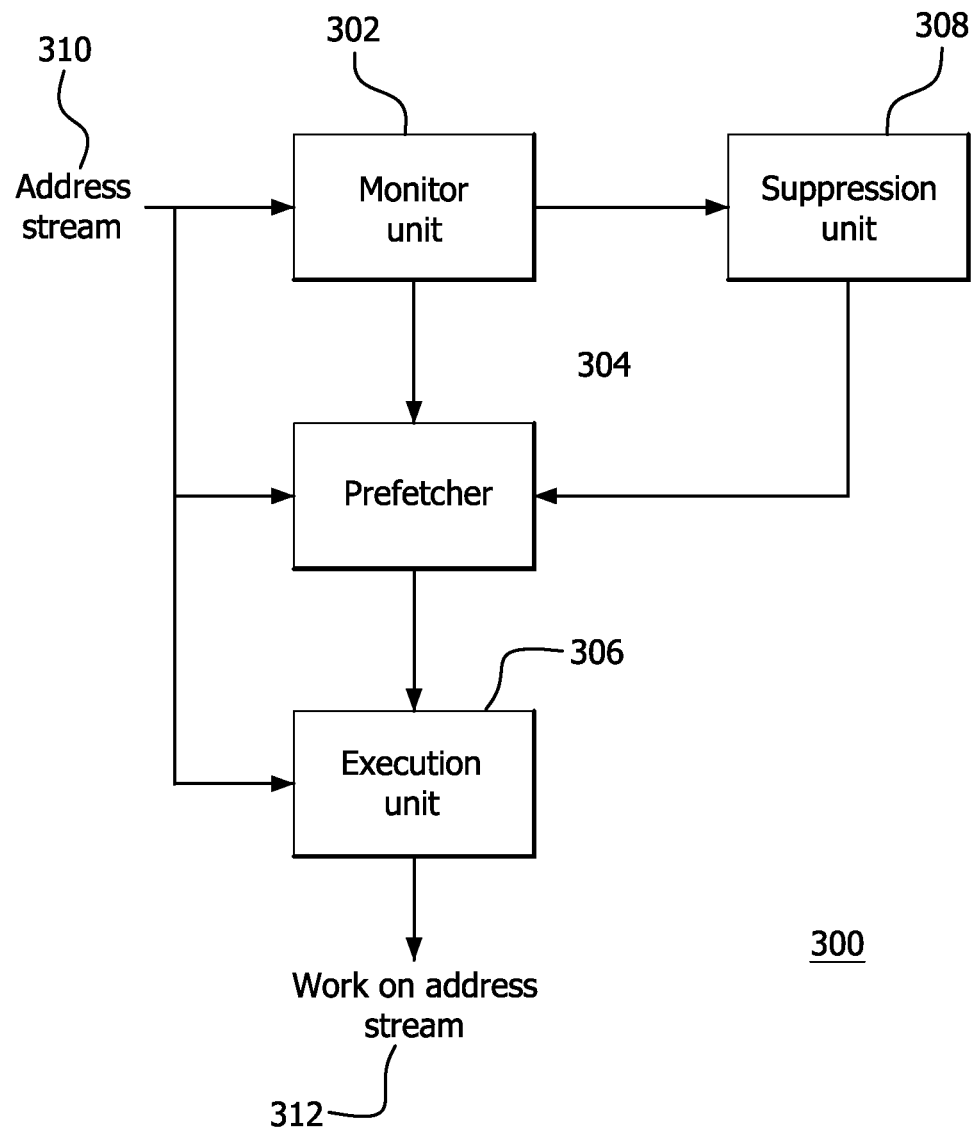
FIG. 3 is a block diagram of a portion of a processor configured to perform the method shown in FIG. 2, according to some embodiments.

FIG. 3 is a block diagram of a portion of a processor 300 configured to perform the method 200 shown in FIG. 2, according to some embodiments. It is understood that the processor 300 shown in FIG. 3 will include other components; only the components relevant to the operation of the method 200 are shown in FIG. 3.

The processor 300 includes a monitor unit 302, a prefetcher 304, an execution unit 306, and a suppression unit 308. It is noted that the execution unit 306 includes, for example, a controller issuing requests to the memory hierarchy, and should not be confused with the execution unit of a microprocessor that takes instructions or micro-ops as input.

An address stream 310 is provided to the monitor unit 302, the prefetcher 304, and the execution unit 306. The monitor unit 302 is configured to monitor the address stream 310 to determine that a new address from an address stream is directed to the prefetcher table. The prefetcher table entry for that address is accessed and a determination is made whether the prefetcher table entry has locked on a stride. If the prefetcher table entry has not locked on a stride, then the prefetcher table entry is trained using the new address, and the monitor unit 302 waits for the next new address from the address stream 310.

If the prefetcher table entry has locked on a stride, then the monitor unit 302 updates the prefetch suppression logic in the suppression unit 308. The suppression unit 308 determines if suppression has been enabled for the current prefetcher table entry. If suppression has not been enabled, then the suppression unit 308 permits the prefetcher 304 to issue a prefetch request from the current prefetcher table entry. The prefetched addresses are passed to the execution unit 306, which outputs work on the address stream 312. It is noted that the execution unit 306 will produce work on the address stream 312 based on the address stream 310 directly, prefetched addresses from the prefetcher 304, or both. The prefetcher table entry is trained using the new address, and the monitor unit 302 waits for the next new address from the address stream 310.

If suppression has been enabled for the current prefetcher table entry, then the suppression unit 308 does not permit the prefetcher 304 to issue a prefetch for the current prefetcher table entry. The prefetcher table entry is trained using the new address, and the monitor unit 302 waits for the next new address from the address stream 310.

FIGS. 4A-4D are a flowchart of another method 400 for tracking prefetches generated by a stride prefetcher, using a countdown counter, a randomness counter, and a confidence counter, according to some embodiments. In the method 400, the following abbreviations are used. It is noted that the sizes of the counters below are exemplary, and that a person skilled in the art can implement the method 400 using counters of any size.

CC=Confidence Counter, an M-bit counter initialized to 0.
CCThrHigh=A programmable upper threshold value for CC.
CD=Countdown counter, an N-Bit counter initialized to 0.
D=Stride distance, which is the difference between two consecutive addresses in the address stream ($0<D<2^N$).
MaxLength=An upper threshold value for the current stream length.
MaxRC=A maximum value for the randomness counter RC.
MSL=Maximum Stream Length, an N-bit counter initialized to 0 (referred to in the description above as the address space transition periodicity of length P).
RC=Randomness Counter, an S-bit counter initialized to 0.
RCThrHigh=A programmable upper threshold value for RC.
RCThrLow=A programmable lower threshold value for RC.
RSL=Running Stream Length, an N-bit counter initialized to 0, that stores the last recorded stream length.
SP=A flag to indicate whether to suppress prefetches. If this flag is set to zero, then suppression is disabled. If this flag is set to one, then suppression is enabled.
X=Current Stream Length, an N-bit counter.

The method 400 includes the actions taken for a given locked stride, stored in a single entry of a prefetcher table. Upon arrival of a new address directed to that prefetcher table entry, if the new stride matches the locked stride, the new stride is included in the same stream length, so increment X (to track the current stream length) and decrement CD (to track when to suppress prefetching). If CD drops below the stride distance D, then stop generating prefetch requests for the locked stride (suppression is enabled).

If the new stride is different from the locked stride length, then the end of the stream is detected, and if MSL and RSL are not initialized, then they are initialized (RSL is set to X, so it always tracks the latest stream length) along with the confidence counter and the randomness counter. The suppression mechanism is also enabled. The next time an "end of stride sequence" is encountered, compare RSL with X. If the new stream length remains the same, decrement the randomness counter and re-enable suppression (SP is set to one) if the randomness counter drops below a threshold. Since the stream length has not changed, increment the confidence counter and if it exceeds a threshold, lock on the current stream length (stored in MSL) and enable suppression. If the stream length has changed (RSL≠X) then increment the randomness counter and if it exceeds a threshold, deactivate suppression (SP is set to zero).

The rationale is that if the stream length is not predictable, do not suppress prefetches to minimize any performance overhead. The confidence counter is reset to indicate a low confidence in the stream length prediction. If the current stream length, X, is greater than MSL (the maximum stream length currently recorded), then lock on it right away. If prefetches are always suppressed based on the longest recorded stream length and if the prediction is inaccurate (meaning that the actual stream length is shorter), then useful prefetches will not be suppressed.

If MSL saturates, then disable prefetch suppression because it is not known what the real stream length is. This is done to avoid suppressing useful prefetches on longer stream lengths than what has been recorded. In general, the instructions per cycle (IPC) loss from dropping useful prefetches is much higher than the IPC loss of issuing unnecessary prefetches. The last actions taken are to modify CD to allow or discard the generated prefetch, to update RSL (which always points to the last recorded stream length), and reset X because the end of stride was detected.

More specifically, in the method 400, a new address is fetched for the current stream (step 402). A determination is made whether the prefetcher entry has locked on a stride (step 404). If the prefetcher entry has not locked on a stride, then the next address is fetched for the current stream (step 402). If the prefetcher entry has locked on a stride (step 404), then a determination is made whether the current stride matches the locked stride (the stored stream length; step 406). If the current stride does not match the locked stride, this indicates that the end of the stride has been detected. A determination is then made whether the maximum stream length counter and the running stream length counter are equal to zero (step 408). If both the maximum stream length counter and the running stream length counter are equal to zero, then the maximum stream length counter and the running stream length counter are both set equal to the current stream length, prefetch suppression is enabled by setting the SP flag to one, and the randomness counter and the confidence counter are both set equal to zero (step 410). Because the end of the stride has been detected, the stream length counters are set to the current stream length, in case the same stream length is later repeated and further prefetches into the address stream need to be suppressed.

Next, a determination is made whether prefetch suppression has been enabled (whether the SP flag is set to zero; step 412). If prefetch suppression has been disabled (the SP flag is set to zero), then the countdown counter is set to zero (step 414). If prefetch suppression has been enabled (the SP flag is set to one; step 412), then the countdown counter is set to the maximum stream length (step 416). The countdown counter is set based on the status of the prefetch suppression. If prefetches are not suppressed, the countdown counter is set to zero, because it will not be needed. If prefetches are suppressed, then the countdown counter is set to the maximum stream length, to enable checking of the current stream length.

The running stream length counter is set to the current stream length (step 418), to ensure that the latest stream length is being tracked. The current stream length counter is reset to one (step 420), because the end of the current stream has been detected and a new stream is counted.

Figure 4A:
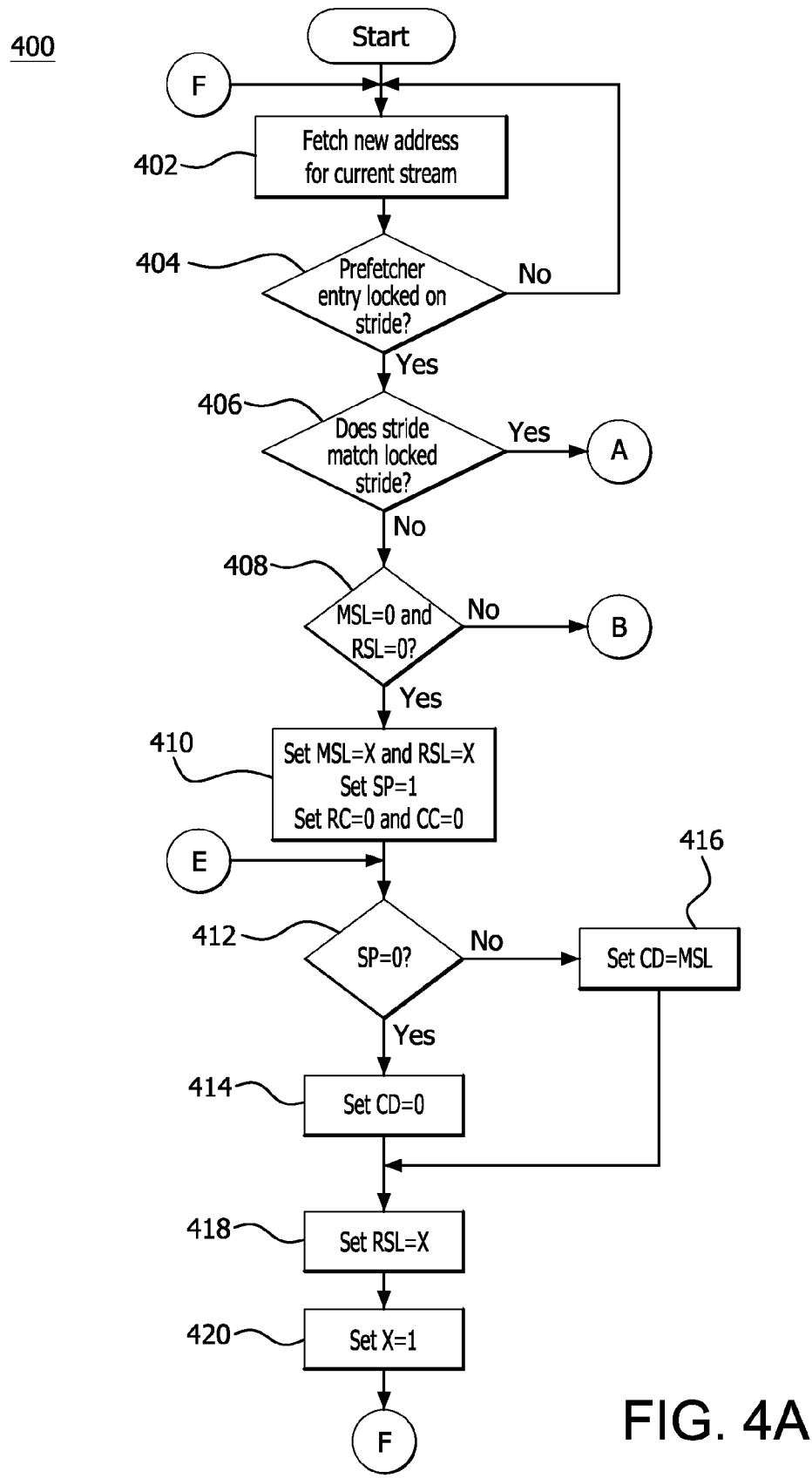
FIGS. 4A-4D are a flowchart of another method for tracking prefetches in a stride prefetcher, according to some embodiments.
Figure 4B:
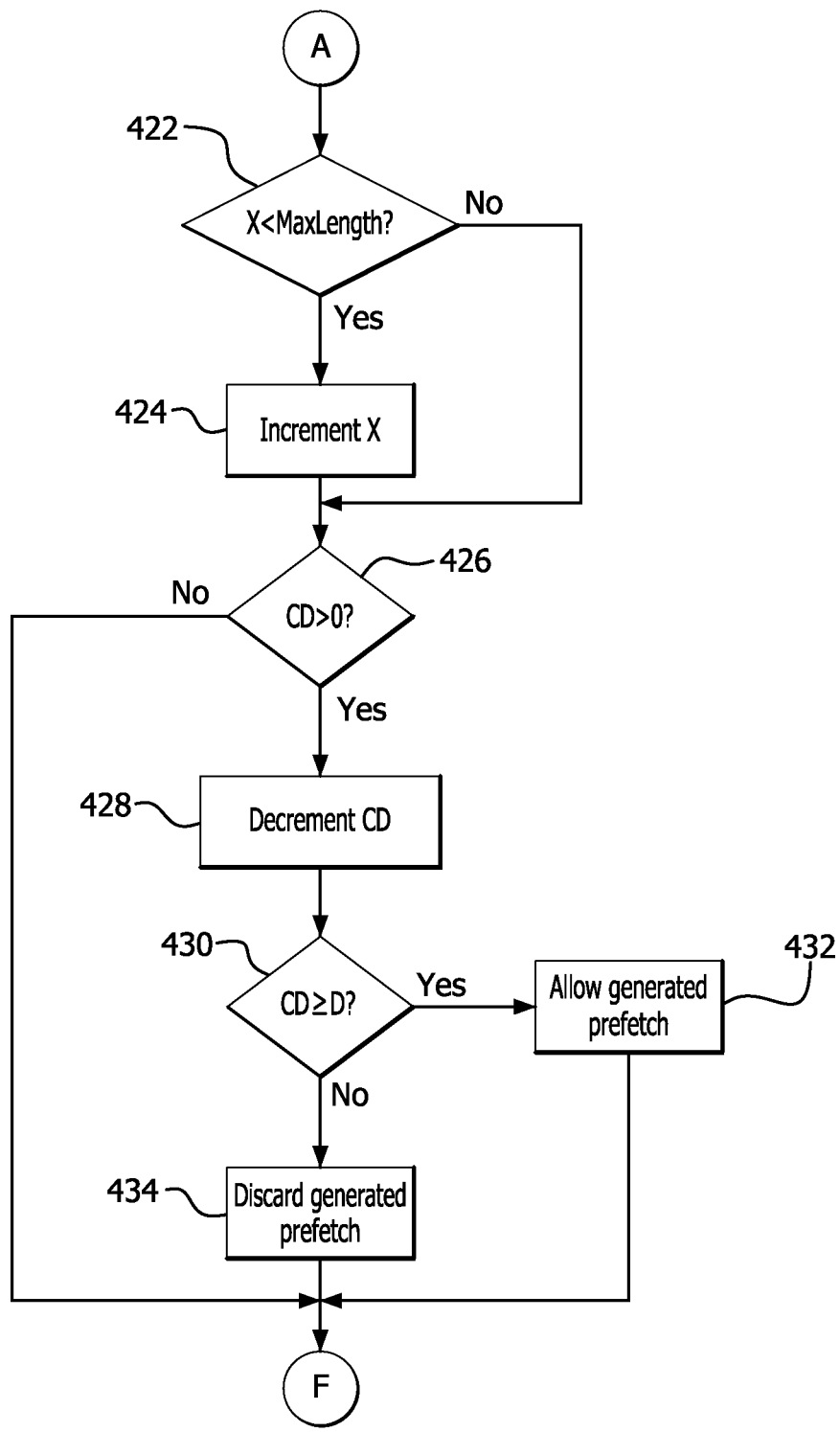

If the end of the current stream has not been reached (step 402) or if the current stride matches the locked stride (step 406), then a determination is made whether the current stream length (X) is less than the upper threshold for the current stream length (MaxLength; step 422 in FIG. 4B). If the current stream length is less than the maximum stream length, then the current stream length is incremented to track the current stream's length (step 424). If the current stream length is greater than the maximum stream length (step 422) or after the current stream length has been incremented (step 424), a determination is made whether the countdown counter is greater than zero (step 426). If the countdown counter is equal to zero (meaning that prefetch suppression has been disabled), then the method returns to fetch a new address for the current stream as described above (step 402; FIG. 4A).

If the countdown counter is greater than zero (step 426), then this indicates that prefetch suppression has been enabled, and the countdown counter is decremented (step 428). A determination is made whether the countdown counter is greater than or equal to the stride distance (step 430). If the countdown counter is greater than or equal to the stride distance, then the generated prefetch is allowed (step 432) and the method returns to fetch a new address for the current stream as described above (step 402; FIG. 4A). If the countdown counter is less than the stride distance (step 430), then the generated prefetch is discarded (step 434) and the method returns to fetch a new address for the current stream as described above (step 402; FIG. 4A).

Figure 4C:
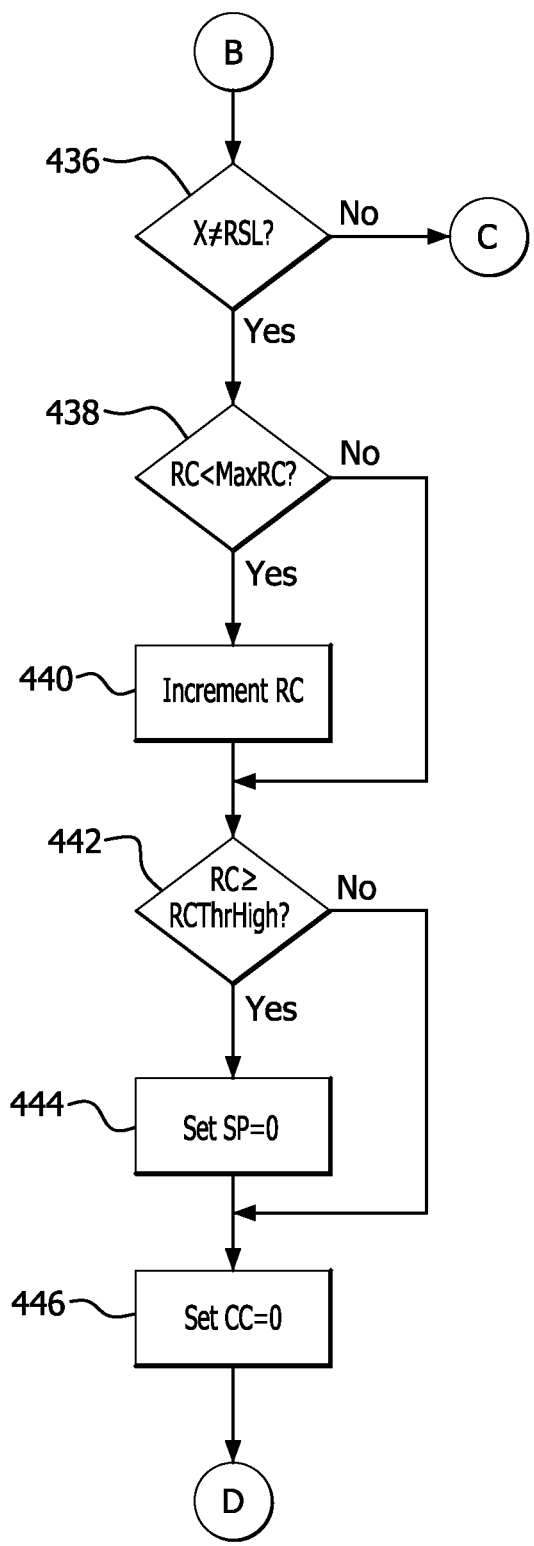

If either the maximum stream length counter or the running stream length counter are not equal to zero (step 408; FIG. 4A), then a check is made whether the current stream length does not equal the running stream length counter (step 436; FIG. 4C). If the current stream length does not equal the running stream length counter, then the randomness counter is compared to the maximum possible value of the randomness counter (step 438). If the randomness counter is less than the maximum possible value of the randomness counter, then the randomness counter is incremented (step 440).

If the randomness counter is greater than or equal to the maximum possible value for the randomness counter (step 438) or after the randomness counter is incremented (step 440), the randomness counter is compared to the high threshold for the randomness counter (step 442). If the randomness counter is greater than or equal to the high threshold for the randomness counter, then prefetch suppression is disabled (setting the SP flag to zero) due to randomness in the stream length (step 444). If the randomness counter is less than the high threshold for the randomness counter (step 442) or after prefetch suppression is disabled (step 444), the confidence counter is set to zero (step 446).

Figure 4D:
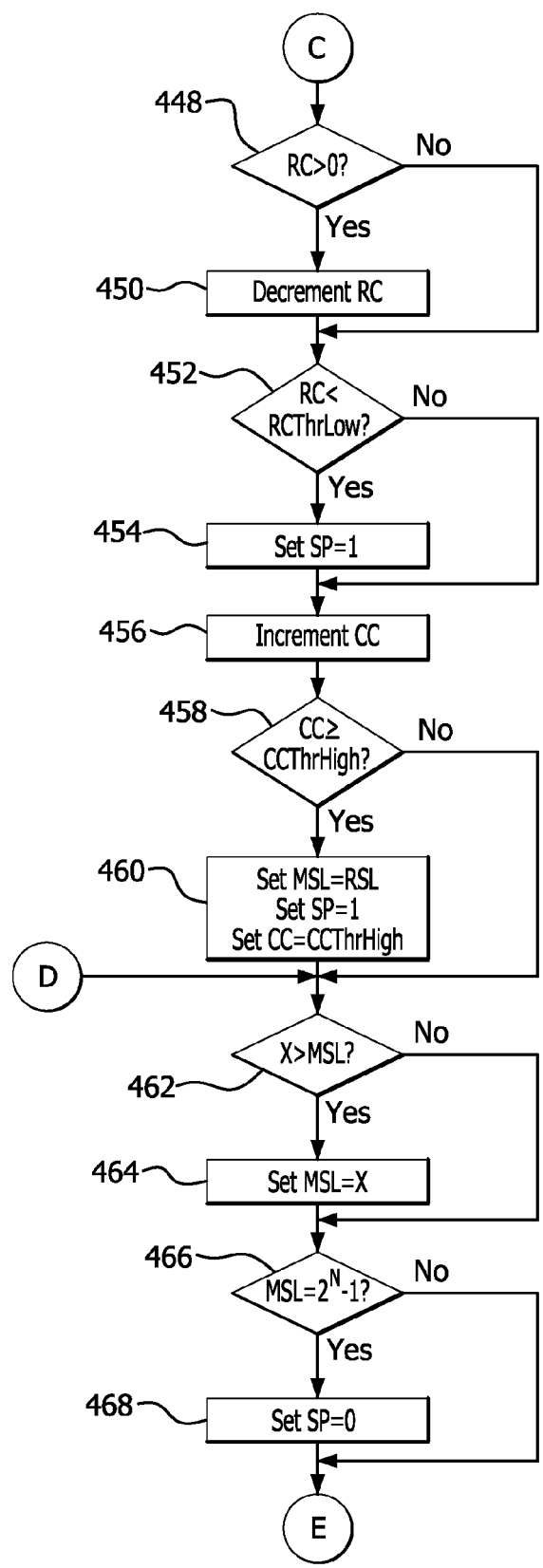

If the current stream length equals the running stream length counter (step 436), then the randomness counter is checked whether it is greater than zero (step 448; FIG. 4D). If the randomness counter is greater than zero, then the randomness counter is decremented (step 450). If the randomness counter equals zero (step 448) or after the randomness counter is decremented (step 450), the randomness counter is compared to the low threshold for the randomness counter (step 452).

If the randomness counter is less than the low threshold for the randomness counter, then prefetch suppression is enabled by setting the SP flag equal to one (step 454), because the stream length is predictable. If the randomness counter is greater than or equal to the low threshold for the randomness counter (step 452) or after prefetch suppression is enabled (step 454), the confidence counter is incremented (step 456). The confidence counter is compared to the high threshold for the confidence counter (step 458). If the confidence counter is greater than or equal to the high threshold for the confidence counter, then the maximum stream length is set to be equal to the running stream length, prefetch suppression is enabled (by setting the SP flag to one), and the confidence counter is set equal to the high threshold for the confidence counter (step 460). The maximum stream length is set to be equal to the running stream length because the confidence of repeating the same stream length is high enough.

After the confidence counter is set to zero (step 446; FIG. 4C), if the confidence counter is below the high threshold for the confidence counter (step 458), or after the confidence counter is set equal to the high threshold for the confidence counter (step 460), the current stream length is compared to the maximum stream length (step 462). If the current stream length is greater than the maximum stream length, then the maximum stream length is set equal to the current stream length (step 464), because the method will always lock onto the longer stream length.

If the current stream length is less than or equal to the maximum stream length (step 462) or after the maximum stream length is set equal to the current stream length (step 464), the maximum stream length is compared to the maximum possible stream length value ($2^N-1$; step 466). If the maximum stream length is equal to the maximum possible stream length value, then prefetch suppression is disabled (step 468) because the maximum possible stream length value has been reached (the N-bit counter has saturated) and it is not known what the actual stream length will be. If the maximum stream length is not equal to the maximum possible stream length value (step 466) or after prefetch suppression is disabled (step 468), the method returns to the determination of whether prefetch suppression has been enabled (SP flag is set to zero; step 412).

The method 400 may eliminate a significant number of useless stride prefetches with a high accuracy, resulting in several advantages. A higher IPC may be achieved due to reduced memory bandwidth requirements or due to less unnecessary prefetched data which translates to lower cache miss rate. Also, the dynamic power may be lower due to issuing fewer prefetches to the memory system. The method 400 also allows for fine-grain throttling of the prefetcher per individual stride stream.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for tracking prefetches generated by a stride prefetcher, comprising:
   responsive to a prefetcher table entry for an address stream locking on a stride,
      updating prefetch suppression logic; and
      suppressing prefetches from the prefetcher table entry when suppression is enabled for the prefetcher table entry;
   training the prefetcher table entry using the address in the address stream, wherein the training includes monitoring the address stream to determine a repeating pattern in the address stream, wherein the repeating pattern is a constant number of accesses between transitions to the locked stride;
   setting a maximum stream length counter and a running stream length counter to match a current stream length; and
   setting a randomness counter and a confidence counter to zero.

2. The method according to claim 1, wherein a stride is a difference between two consecutive addresses in the address stream.

3. The method according to claim 1, further comprising:
   issuing a prefetch request from the prefetcher table entry when suppression is not enabled for the prefetcher table entry.

4. The method according to claim 1, wherein the maximum stream length counter is used to set a countdown counter, the countdown counter being used to determine whether subsequent prefetches would be beyond the end of the repeating pattern.

5. The method according to claim 1, wherein the running stream length counter and the randomness counter are used to determine whether the current stream length is predictable.

6. The method according to claim 1, wherein the confidence counter is used to determine whether the maximum stream length counter should be set to the current stream length because the current stream length has been observed multiple times.

7. An apparatus in a processor for tracking prefetches generated by a stride prefetcher in the processor, the apparatus comprising:
   a monitor unit configured to:
      monitor an address stream to determine that a new address from the address stream is directed to a prefetcher table; and
      monitor the address stream to determine a repeating pattern in the address stream, wherein the repeating pattern is a constant number of accesses between transitions to the locked stride;
   a prefetcher in communication with the monitor unit, the prefetcher configured to:
      prefetch addresses from the address stream;
      determine whether a prefetcher table entry for the address stream has locked on a stride; and
      train the prefetcher table entry using the address in the address stream;
   a suppression unit in communication with the monitor unit and the prefetcher, the suppression unit configured to:
      suppress prefetches from the prefetcher table entry when suppression is enabled for the prefetcher table entry;
      set a maximum stream length counter and a running stream length counter to match a current stream length; and
      set a randomness counter and a confidence counter to zero.

8. The apparatus according to claim 7, wherein a stride is a difference between two consecutive addresses in the address stream.

9. The apparatus according to claim 7, wherein the suppression unit is further configured to:
   issue a prefetch request from the prefetcher table entry when suppression is not enabled for the prefetcher table entry.

10. The apparatus according to claim 7, wherein the suppression unit is further configured to:
    use the maximum stream length counter to set a countdown counter, the countdown counter being used to determine whether subsequent prefetches would be beyond the end of the repeating pattern.

11. The apparatus according to claim 7, wherein the suppression unit is further configured to:
    use the running stream length counter and the randomness counter to determine whether the current stream length is predictable.

12. The apparatus according to claim 7, wherein the suppression unit is further configured to:
    use the confidence counter to determine whether the maximum stream length counter should be set to the current stream length because the current stream length has been observed multiple times.

13. A non-transitory computer-readable storage medium storing a set of instructions for execution by a general purpose computer to track prefetches generated by a stride prefetcher, the set of instructions comprising:
    an updating code segment for updating prefetch suppression logic responsive to a prefetcher table entry for an address stream locking on a stride; and
    a suppressing code segment for suppressing prefetches from the prefetcher table entry when suppression is enabled for the prefetcher table entry;
    a training code segment for training the prefetcher table entry using the address in the address stream, wherein the training includes monitoring the address stream to determine a repeating pattern in the address stream, wherein the repeating pattern is a constant number of accesses between transitions to the locked stride;
    a first setting code segment for setting a maximum stream length counter and a running stream length counter to match a current stream length; and
    a second setting code segment for setting a randomness counter and a confidence counter to zero.

14. The non-transitory computer-readable storage medium according to claim 13, wherein a stride is a difference between consecutive addresses in the address stream.

15. The non-transitory computer-readable storage medium according to claim 13, wherein the instructions are hardware description language (HDL) instructions used for the manufacture of a device.

16. The non-transitory computer-readable storage medium according to claim 13, further comprising:
   an issuing code segment for issuing a prefetch request from the prefetcher table entry when suppression is not enabled for the prefetcher table entry.

* * * * *